(12) United States Patent
Chitnis et al.

(10) Patent No.: US 11,068,308 B2
(45) Date of Patent: Jul. 20, 2021

(54) THREAD SCHEDULING FOR MULTITHREADED DATA PROCESSING ENVIRONMENTS

(71) Applicant: Texas Instruments Incorporated, Dallas, TX (US)

(72) Inventors: Kedar Chitnis, Bangalore (IN); Mihir Narendra Mody, Bangalore (IN); Jesse Gregory Villarreal, Jr., Richardson, TX (US); Lucas Carl Weaver, Farmers Branch, TX (US); Brijesh Jadav, Bangalore (IN); Niraj Nandan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 212 days.

(21) Appl. No.: 16/298,709

(22) Filed: Mar. 11, 2019

(65) Prior Publication Data
US 2019/0286483 A1 Sep. 19, 2019

Related U.S. Application Data

(60) Provisional application No. 62/643,009, filed on Mar. 14, 2018.

(51) Int. Cl.
*G06F 9/48* (2006.01)
*G06F 9/54* (2006.01)
*G06F 9/50* (2006.01)

(52) U.S. Cl.
CPC .............. *G06F 9/4887* (2013.01); *G06F 9/50* (2013.01); *G06F 9/544* (2013.01); *G06F 9/4881* (2013.01)

(58) Field of Classification Search
None
See application file for complete search history.

(56) References Cited

U.S. PATENT DOCUMENTS

| 2004/0199916 | A1* | 10/2004 | Joffe | G06F 9/52 718/100 |
|---|---|---|---|---|
| 2007/0113053 | A1 | 5/2007 | Jensen et al. | |
| 2017/0168755 | A1 | 6/2017 | Lo | |

OTHER PUBLICATIONS

International Preliminary Report of Patentability for PCT/US19/21970. (Year: 2019).*
International Search Report dated Jun. 6, 2019.

* cited by examiner

*Primary Examiner* — Qing Yuan Wu
(74) *Attorney, Agent, or Firm* — Charles F. Koch; Charles A. Brill; Frank D. Cimino (57) ABSTRACT

Methods, apparatus, systems and articles of manufacture (e.g., physical storage media) to implement thread scheduling for multithreaded data processing environments are disclosed. Example thread schedulers disclosed herein for a data processing system include a buffer manager to determine availability of respective buffers to be acquired for respective processing threads implementing respective functional nodes of a processing flow, and to identify first ones of the processing threads as stalled due to unavailability of at least one buffer in the respective buffers to be acquired for the first ones of the processing threads. Disclosed example thread schedulers also include a thread execution manager to initiate execution of second ones of the processing threads that are not identified as stalled.

17 Claims, 11 Drawing Sheets

FIG. 1

SOFTWARE THREAD
SCHEDULER (STS)
205

```
2   /* One thread per SW function (node) */
3   ThreadMain(node)
4   {
5       while (1)
6       {
7           /* wait for input/outpur Bufs */
8           for (i =0 ; i < node.numBufs; i++)
9           {
10              /* Wait until Buf is available */
11              do
12      215⤵   bufs[i] = AcquireBuf (node, i)  ←210
13              while(bufs[i]==NULL);
14          }
15
16          /* all Bufs acquired, execute node */
17          ExecuteNode(node, bufs);
18
19  220     for (i =0 ; i < node.numBufs; i++)
20  225⤵       ReleaseBuf(node, i, bufs[i]);
21          /* trigger nodes following current node
22          * buffer release could make next set of nodes
23  230     * ready for execution
24          */
25          TriggerNextNodes(node.nextNodes);
26      }
27  }
```

SOFTWARE THREAD
SCHEDULER (STS)
400

```
2   /* One thread per SW function (node) */              205
3   ThreadMain(node)
4   {
5       2   /* One thread per SW function (node) */      205
6       3   ThreadMain(node)
7       4   {
8           2   /* One thread per SW function (node) */  205
9           3   ThreadMain(node)
10          4   {
11              2   /* One thread per SW function (node) */  205
12              3   ThreadMain(node)
13              4   {
14                  2   /* One thread per SW function (node) */  205
15                  3   ThreadMain(node)
16                  4   {
17                      5   while (1)
18                      6   {
19                          7       /* wait for input/outpur Bufs */
20                          8       for (i =0 ; i < node.numBufs; i++)
21                          9       {
22                          10          /* Wait until Buf is available */
23                          11          do
24                          12              bufs[i] = AcquireBuf (node, i)
25                          13          while(bufs[i]==NULL);
26                          14      }
27 }                        15
    24                      16      /* all Bufs acquired, execute node */
    25                      17      ExecuteNode(node, bufs);
    26                      18
    27 }                    19      for (i =0 ; i < node.numBufs; i++)
                            20          ReleaseBuf(node, i, bufs[i]);
                            21      /* trigger nodes following current node
                            22       * buffer release could make next set of nodes
                            23       * ready for execution
                            24       */
                            25      TriggerNextNodes(node.nextNodes);
                            26  }
                            27 }
```

ENHANCE SOFTWARE
THREAD SCHEDULER (STS)
705

```
2   /* Disclosed Solution, One thread for all SW functions (node) */
3   ThreadMain()
4   {
5       while (1)
6       {
7           /* block until a new node available to execute */
8           node = GetNextFuncToExecute();  ← 720
9
10          /* attempt to acquire all Bufs */
11          AcquireBufs(node, bufs, &isStalled)  ← 710
12          if(isStalled == FALSE)
13          {
14              /* all Bufs acquired, execute node */
15              ExecuteNode(node, bufs)  ← 725
16              ReleaseBufs(node, bufs,  ← 715
17                      &unstalledNodes, &numUnStalledNodes);
18              /* trigger nodes stalled by 'bufs'
19               * unstalledNodes could be ready for execution
20               */
21              TriggerStalledNodes(unstalledNodes, numUnstalledNodes);  ← 730
22              /* trigger nodes following current node
23               * buffer release could make next set of nodes
24               * ready for execution
25               */
26              TriggerNextNodes(node.nextNodes);  ← 735
27          }
28          else
29          {
30              /* current node could not acquire some Bufs,
31               * Continue and don't block others nodes from executing
32               * within the same thread
33               */
34          }
35      }
36  }
```

FIG. 7A

ENHANCED SOFTWARE
THREAD SCHEDULER (STS)
705

```
38  AcquireBufs(node, bufs, isStalled)  ←―710
39  {
40      isStalled = FALSE;
41      for (i =0 ; i < node.numBufs; i++)
42      {
43          bufs[i] = AcquireBuf(node, i)  ←―740
44          if(bufs[i]==NULL)
45          {
46              AddNodeToStallListOfBuf(bufs[i], node)  ←―745
47              isStalled = TRUE;
48              break;
49          }
50      }
51  }
52
53  ReleaseBufs(node, bufs,
54                unstalledNodes, numUnStalledNodes)  ←―715
55  {
56      numStalledNodes = 0;
57      for (i=0 ; i < node.numBufs; i++)
58      {
59          /* add nodes stalled on this buffer
60           * to unstalled list */
61          numUnStalledNodes +=
62              GetNodeFromStallListOfBuf(bufs[i],  ←―750
63                  &unstalledNodes[numUnStalledNodes]);
64  |       /* release buffer */
65          ReleaseBuf(node, i, bufs[i]);  ←―755
66      }
67  }
```

THREAD SCHEDULING FOR MULTITHREADED DATA PROCESSING ENVIRONMENTS

RELATED APPLICATION(S)

This patent claims the benefit of and priority to U.S. provisional patent application Ser. No. 62/643,009, which is entitled "THREAD SCHEDULING FOR MULTI-THREADED PROCESSING ENVIRONMENTS," and which was filed on Mar. 14, 2018. U.S. provisional patent application Ser. No. 62/643,009 is hereby incorporated herein by reference in its entirety.

FIELD OF THE DISCLOSURE

This disclosure relates generally to thread scheduling and, more particularly, to thread scheduling for multithreaded data processing environments, such as thread scheduling in computer vision and imaging systems.

BACKGROUND

In computer processing system, several functions may need to be executed on data according to a data processing flow, with the output(s) of one function providing the input(s) for the next function to be executed in the processing flow. To permit asynchronous implementation of several such processing flows in parallel, some computer processing systems utilize a respective processing thread to implement each function of the processing flow. Such computer data processing systems may employ thread schedulers to schedule execution of the processing threads.

SUMMARY

An example thread scheduler disclosed herein for an image processing system includes a buffer manager to determine availability of respective buffers to be acquired for respective processing threads implementing respective functional nodes of an image processing flow, and to identify first ones of the processing threads as stalled due to unavailability of at least one buffer in the respective buffers to be acquired for the first ones of the processing threads. The example thread scheduler also includes a thread execution manager to initiate execution of second ones of the processing threads that are not identified as stalled.

An example non-transitory computer readable medium disclosed herein includes example computer readable instructions that, when executed by a processor, cause the processor to at least determine availability of buffers to be acquired for processing threads implementing functional nodes of a processing flow. The example computer readable instructions also cause the processor to at least identify a first thread of the processing threads as stalled due to unavailability of at least one of the buffers to be acquired for the first thread. The example computer readable instructions further cause the processor to at least initiate execution of a second thread of the processing threads that is not identified as stalled.

An example thread scheduling method disclosed herein includes determining, by executing an instruction with a processor, availability of respective buffers to be acquired for respective processing threads implementing respective functional nodes of a processing flow. The example thread scheduling method also include identifying, by executing an instruction with the processor, a first one of the processing threads as stalled due to unavailability of at least one buffer to be acquired for the first one of the processing threads. The example thread scheduling method further includes initiating, with the processor, execution of a second one of the processing threads that is not identified as stalled.

BRIEF DESCRIPTION OF THE DRAWINGS

The figures are not to scale. Wherever possible, the same reference numbers will be used throughout the drawing(s) and accompanying written description to refer to the same or like parts, elements, etc.

DETAILED DESCRIPTION

Methods, apparatus, systems and articles of manufacture (e.g., physical storage media) to implement thread scheduling for multithreaded data processing environments, such as video, imaging and/or computer vision processing environments, are disclosed herein. Example thread schedulers disclosed herein for a data processing system include a buffer manager to determine availability of respective groups of buffers to be acquired for respective processing threads implementing respective functional nodes of a data processing flow, and to identify first ones of the processing threads as stalled due to unavailability of at least one buffer in the respective groups of buffers to be acquired for the first ones of the processing threads. Disclosed example thread schedulers also include a thread execution manager to initiate execution of second ones of the processing threads that are not identified as stalled. In at least some disclosed examples, the buffer manager and the thread execution manager of the thread scheduler are implemented by a processor in a processing thread that is different from the processing threads implementing the respective functional nodes of the processing flow.

In at least some disclosed examples, the buffer manager is to store respective states for the buffers in memory. For example, a first one of the states may correspond to a first one of the buffers, and the first one of the states may identify which of the first ones of the processing threads are stalled due to unavailability of the first one of the buffers. In at least some such examples, the buffer manager is to update the first one of the states corresponding to the first one of the buffers to include a respective thread identifier for each one of the first ones of the processing threads that is stalled due to unavailability of the first one of the buffers.

Additionally or alternatively, in at least some disclosed examples, the buffer manager is to update the first one of the states corresponding to the first one of the buffers to indicate that the first ones of the processing threads that were stalled due to unavailability of the first one of the buffers are now unstalled threads when one of the second ones of the processing threads that had acquired the first one of the buffers prior to execution has released the first one of the buffers. In at least some such examples, the buffer manager may remove thread identifiers for the unstalled threads from the first one of the states to update the first one of the states to indicate that the first ones of the processing threads that were stalled due to unavailability of the first one of the buffers have become unstalled. Additionally or alternatively, in at least some such examples, the buffer manager is to maintain a data structure identifying the unstalled threads, and the thread execution manager reattempt to initiate execution of the unstalled processing threads based on the data structure. For example, the data structure may be a first input first output (FIFO) memory buffer, a priority-based queue, etc.

These and other example methods, apparatus, systems and articles of manufacture (e.g., physical storage media) to implement thread scheduling for multithreaded data processing environments are disclosed in greater detail below.

As mentioned above, in some computer processing environments, such as image processing environments, a processing thread, also referred to more succinctly as a thread, is a single, independent execution unit that is executed to perform a particular function. For example, a thread may be executed to perform an image processing function, a vision processing function, etc. Typically, a function implemented by a thread processes data obtained via one or more input buffers and produces output data in one or more output buffers. In an overall computer processing environment, many such functions may need to be executed according to a data processing flow, with the output(s) of one function providing the input(s) for the next function to be executed in the processing flow. Because such a data processing flow may be represented as a connected graph with the nodes of the graph representing the functions to be executed, the terms "functional node" and, more succinctly, "node" are also used herein to refer to a function to be implemented by a thread.

Some computer processing environments employ thread schedulers to schedule execution of processing threads. In general, a thread can begin executing a function when the function is ready to be executed according to the processing flow and when all of the input and output buffers the function will need to access are available (e.g., are not being used by one or more other threads). Some thread schedulers are implemented by respective finite state machines (FSMs) associated with respective ones of the processing threads. Such an FSM defines operational states governing the starting and stopping of processing threads in the computer processing environment. For example, in some implementations, each processing thread to be executed may have an associated thread scheduler FSM that determines whether the input and output buffers the thread will need to access to implement its respective functional node are available. When the FSM determines that all the needed input and output buffers are available, the FSM triggers the thread to begin execution, thereby implementing its respective functional node of the processing environment. When the thread later completes execution, the FSM releases the buffers that were accessed by the thread (so they can be used by another thread in the processing flow). Notably, the FSM of such thread schedulers waits, or blocks execution of its processing thread, and possibly other processing threads, until all of the buffers needed by its processing thread are available.

Some thread scheduler implementations that rely on each processing thread having an associated thread scheduler have several drawbacks. For example, because such a thread scheduler for a given processing thread waits, or blocks execution of its processing thread and possibly other processing threads, until all of the buffers needed by its processing thread are available, processing cycles are wasted and processing throughput suffers while the thread scheduler blocks its thread from executing. Moreover, in some multithreaded processing environments in which multiple processing threads are to be executed, such thread schedulers are be replicated for each processing thread, which increases the amount of memory and other resource overhead for thread scheduling.

Thread scheduling for multithreaded data processing environments as disclosed herein provides technical solutions that overcome the problems/drawbacks associated with other thread schedulers. For example, thread scheduling as disclosed herein utilizes a single, enhanced thread scheduler to schedule multiple processing threads implementing respective functional nodes included in a data processing flow, such as a video, imaging and/or computer vision processing flow. Accordingly, thread scheduling for multithreaded processing environments as disclosed herein avoids the need for thread scheduler replication across each processing thread and, thus, achieves memory/resource overhead reduction relative to other thread scheduler implementations. Furthermore, a single enhanced thread scheduler implemented in accordance with the teachings of this disclosure can maintain acceptable processing throughput by stalling only those processing threads waiting for input and/or output buffers to become available, while allowing other processing threads with available buffers to begin execution. These and other potential benefits of thread scheduling for multithreaded data processing environments are described in further detail below.

Figure 1:
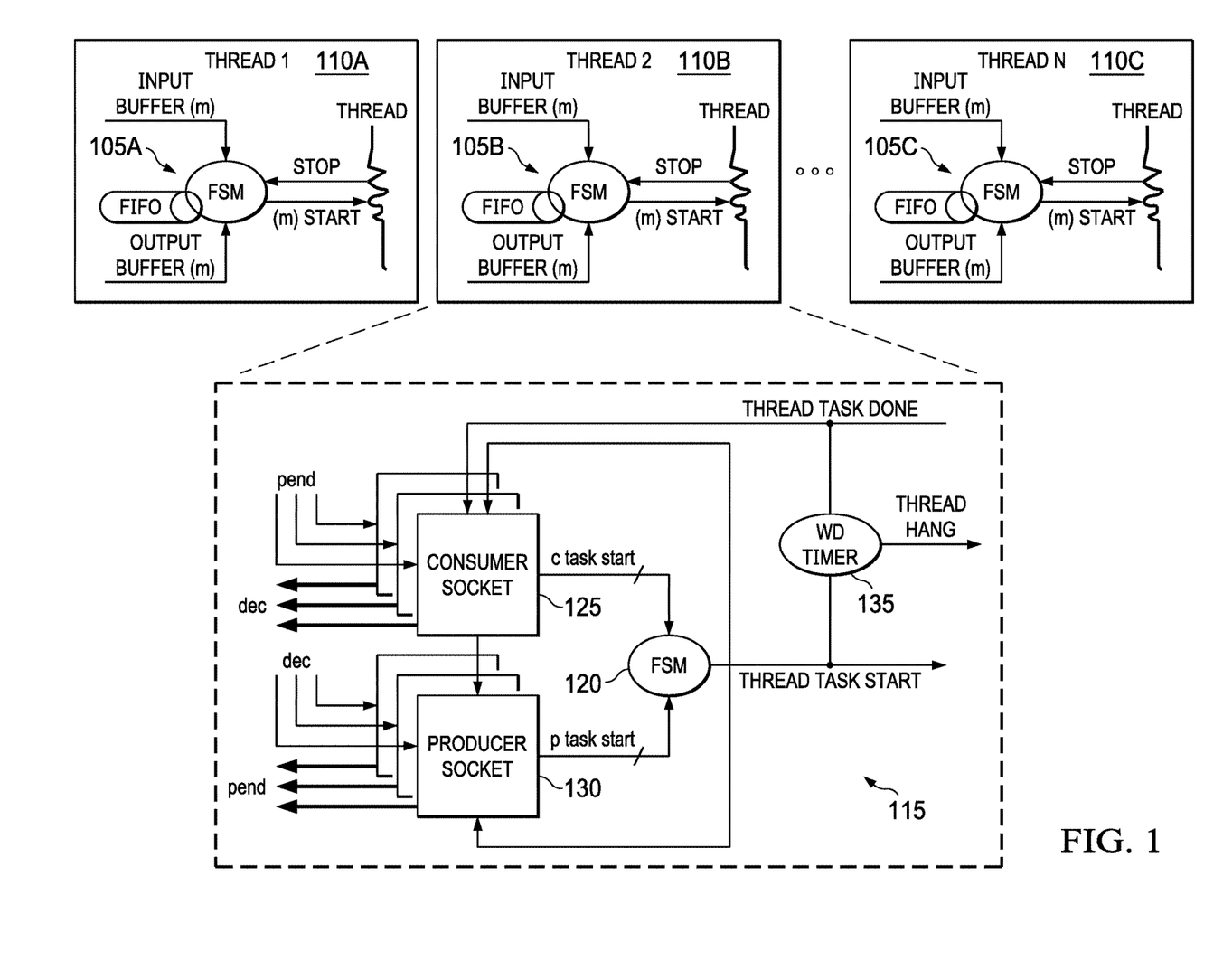
FIG. 1 is a block diagram of example thread schedulers for scheduling execution of processing threads in a computer processing environment.

Turning to the figures, a block diagram of example thread schedulers 105A-C for scheduling execution of example processing threads 110A-C in a data processing environment is illustrated in FIG. 1. The example of FIG. 1 illustrates N processing threads 110A-C, labeled Thread 1, Thread 2, . . . Thread N, to be executed according to a data processing flow. In the illustrated example of FIG. 1, each processing thread 110A-C has a respective thread scheduler 105A-C, represented as an FSM. A detailed view 115 of one of the thread schedulers (e.g., illustrated as the thread scheduler 105B for convenience in FIG. 1, although the detailed view 115 could additionally or alternatively correspond to a detailed view of one or more of the thread schedulers 105A, C) is shown in the bottom half of FIG. 1. As shown in FIG. 1, the example thread scheduler 105B includes an example FSM 120 having logic to determine whether example input buffer(s) 125 (also referred to as consumer socket(s) in FIG. 1) and example output buffer(s) 130 (also referred to as producer socket(s) in FIG. 1) are available for access by the thread 110B (e.g., as indicated by respective c_task_start and p_task_start signals in the example of FIG. 1). The FSM 120 of the thread scheduler of FIG. 1 also has logic that, in combination with an example timer 135, is to cause the thread 110B to hang (or block) while waiting for the buffers 125-130 to become available, and to start the thread 110B when all the needed buffers 125-130 become available. The FSM 120 of the thread scheduler 105B of FIG. 1 further has logic to notify the other processing threads in the data processing flow (e.g., the threads 110A, C) when the given thread 110B being scheduled by the thread scheduler 105B finishes execution.

Figure 2:
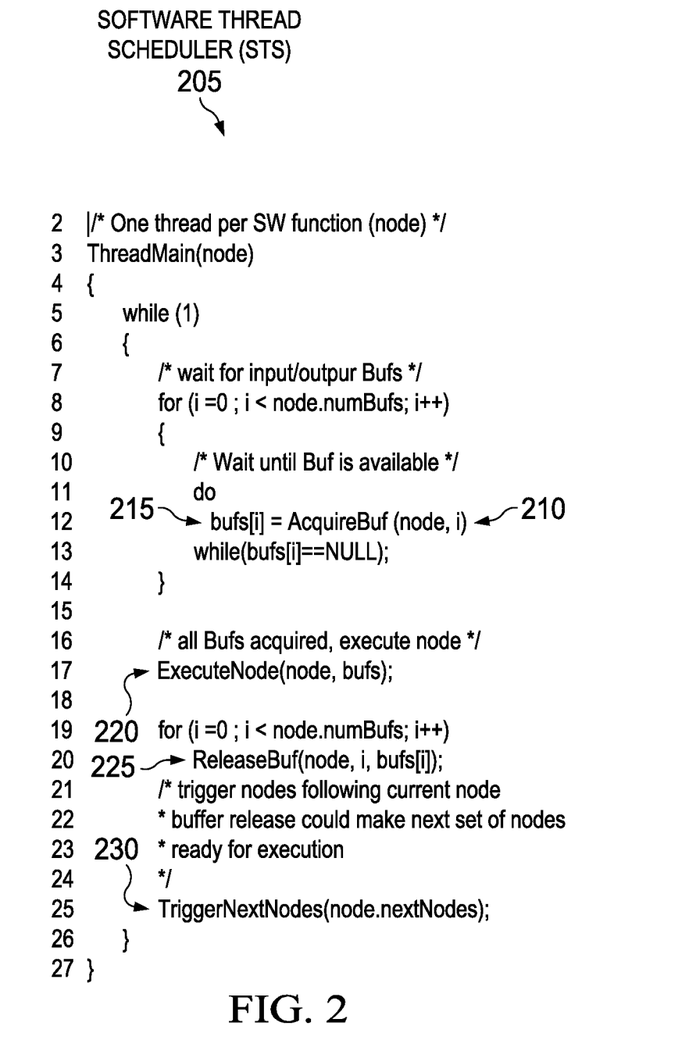
FIG. 2 illustrates an example software-based implementation of the thread scheduler of FIG. 1.

An example software-based implementation of an example thread scheduler 205, which could be used to implement one or more of the example thread schedulers 105A-C of FIG. 1, is illustrated in FIG. 2. The example software-based thread scheduler 2-5 of FIG. 2 is responsible for executing a single processing thread that is to implement a functional node of a data processing flow. The software-based thread scheduler 205 of FIG. 2 includes an example AcquireBuf( ) function 210 in combination with example machine readable instructions at lines 5-14 to acquire the input and output buffers 215 for the given thread being scheduled by the thread scheduler 205. The machine readable instructions at lines 5-14 cause the given processing thread (and other threads) to wait (or block) until all buffers 215 for the given thread become available (e.g., are able to be acquired). The software-based thread scheduler 205 also includes an example ExecuteNode( ) function 220 at line 17 to start executing the given thread when all its buffers become available. The software-based thread scheduler 205 of FIG. 2 further includes an example ReleaseBuf( ) function 225 in combination with example machine-readable instructions at lines 19-20 to release the thread's input and output buffers 215 when thread execution completes, and an example TriggerNextNodes( ) function 230 at line 25 to turn control over to the next functional node (function) to be executed in the processing flow. In the illustrated example of FIG. 2, each function/node is configured with the next function/node to be executed in the processing flow through use of the TriggerNextNodes( ) function 230.

Figure 3:
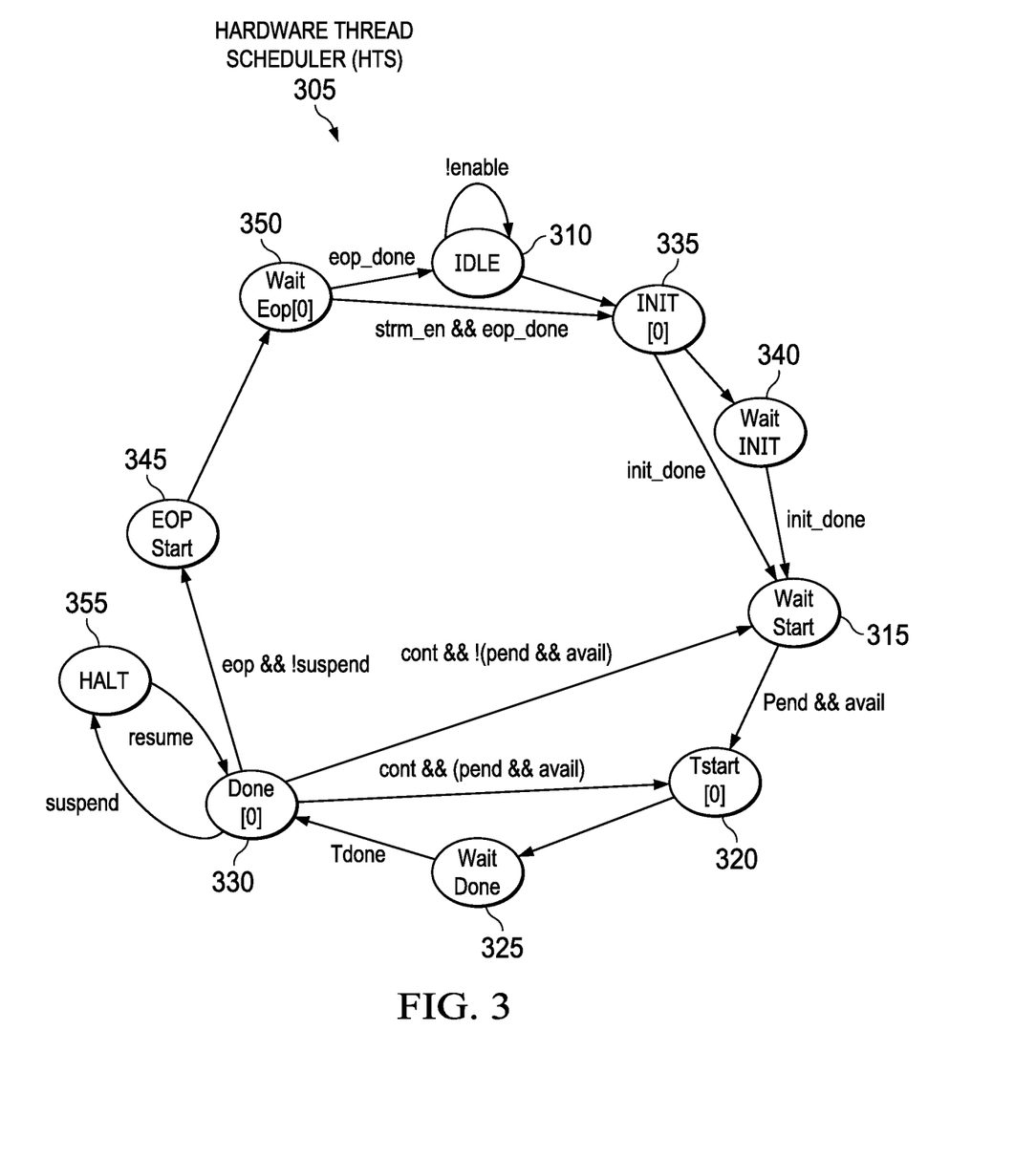
FIG. 3 illustrates an example hardware-based implementation of the thread scheduler of FIG. 1.

An example hardware-based implementation of an example thread scheduler 305, which could be used to implement one or more of the example thread schedulers 105A-C of FIG. 1, is illustrated in FIG. 3. Like the example software-based thread scheduler 205 of FIG. 2, the example hardware-based thread scheduler 305 of FIG. 3 is responsible for executing a single processing thread that is to implement a functional node of a data processing flow. The hardware-based thread scheduler 305 of FIG. 3 is implemented by an FSM in hardware (e.g., digital logic) and/or firmware. The hardware-based thread scheduler 305 in the illustrated example of FIG. 3 includes an example IDLE state 310 to wait until the given thread being scheduled by the thread scheduler 305 is ready to be executed according to the processing flow. The hardware-based thread scheduler 305 of FIG. 3 also includes states to manage hardware initialization (e.g., such as an example Init state 335 and an example Wait Init state 340). The hardware-based thread scheduler 305 of FIG. 3 further includes an example Wait Start state 315 to wait until the input and output buffers for the given processing thread are available (e.g., based on signals provided by the buffers). The thread scheduler 305 includes an example Tstart state 320, an example Wait Done state 325 and an example Done state 330 to cause thread execution to start when the all needed buffers are available, to wait until thread execution completes, and to indicate when thread execution is done, respectively. The thread scheduler 305 of FIG. 3 also includes states to track overall processing flow status (e.g., such as example end-of-picture (EOP) states 345-350 to indicate when video, imaging and/or computer vision processing of a current image/picture is complete), to support debug (e.g., state 355), etc.

Figure 4:
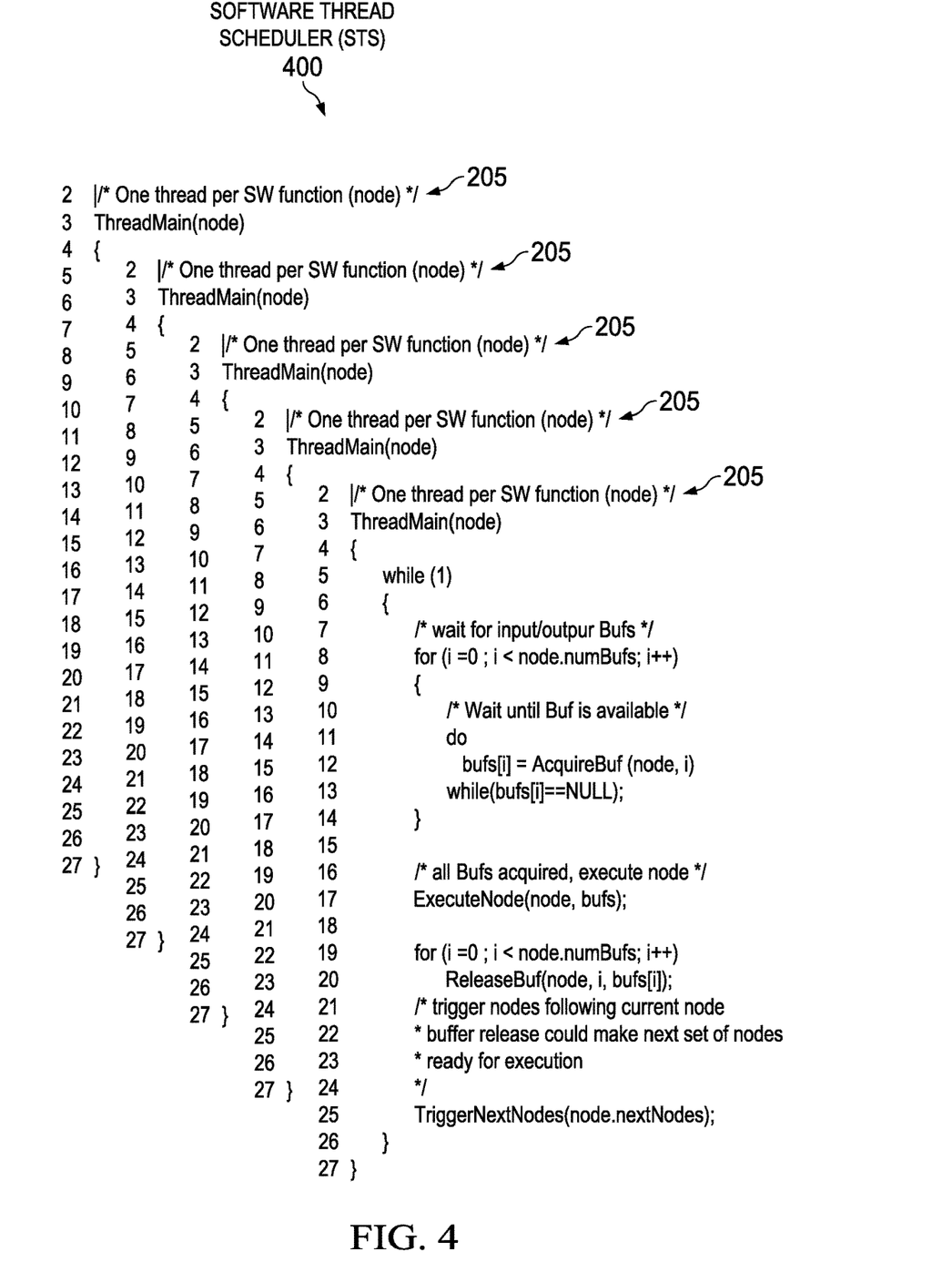
FIG. 4 illustrates an example use of the software-based thread scheduler of FIG. 2 in a multithreaded data processing environment.
Figure 5:
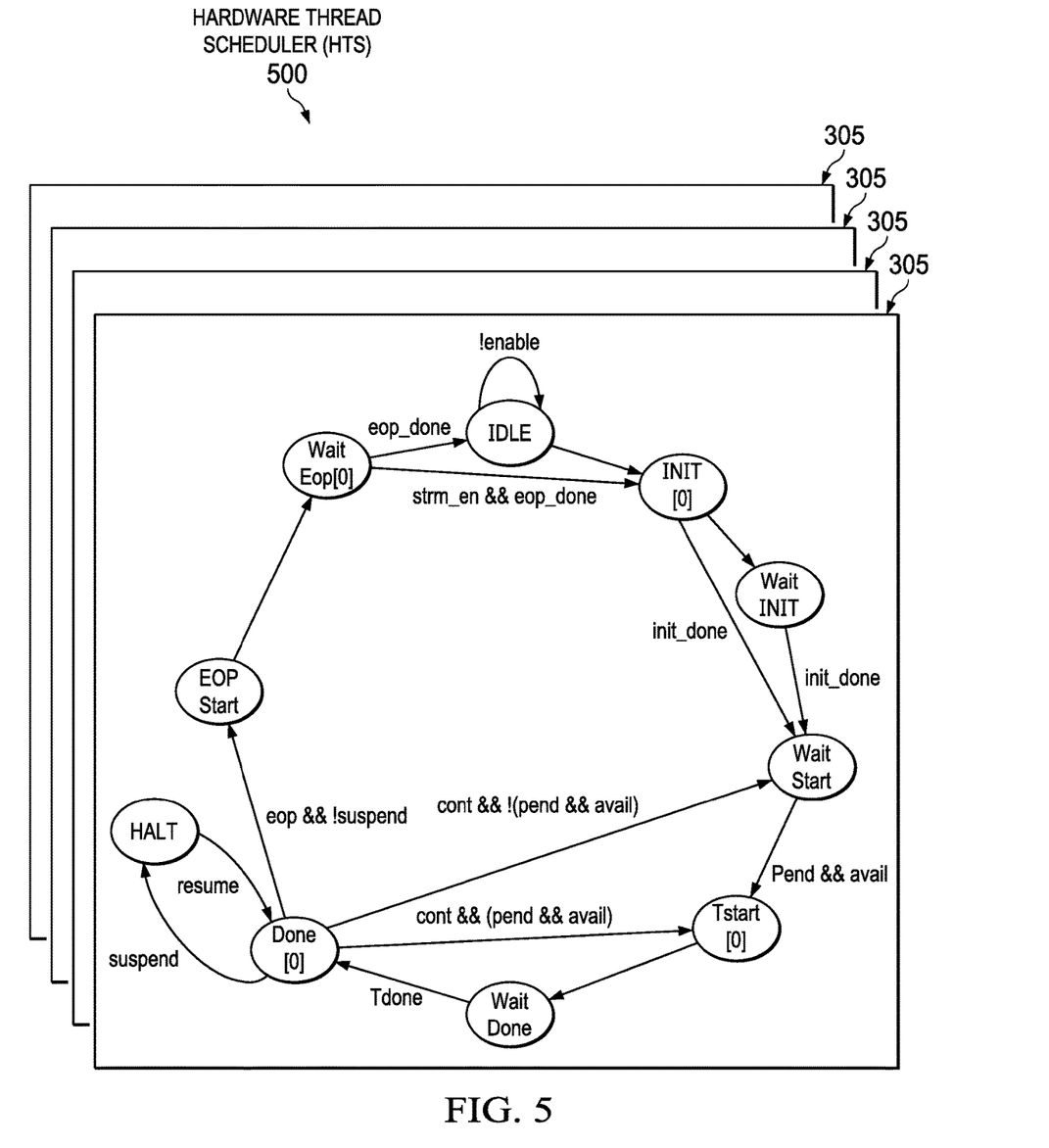
FIG. 5 illustrates an example use of the hardware-based thread scheduler of FIG. 3 in a multithreaded data processing environment.

FIGS. 4-5 illustrate respective example implementations 400 and 500 of the software-based thread scheduler 205 and the hardware-based thread scheduler 305 of FIGS. 2-3 in a multithreaded data processing environment. As noted above and illustrated in FIG. 4, for the example software-based implementation 400, the software-based thread scheduler 205 of FIG. 2 may be replicated for each thread to be executed according to the processing flow in the multithreaded data processing environment. As such, the replication of the software-based thread scheduler 205 may utilize substantial memory and operating system resources, and incur high processing overhead during thread switching, which may reduce overall system performance in some applications. Similarly, as illustrated in FIG. 5, for the example hardware-based implementation 500, the hardware-based thread scheduler 305 of FIG. 3 may be replicated for each thread in the multithreaded data processing environment. As such, the replication of the hardware-based thread scheduler 305 may result in increased silicon area used for thread scheduling (e.g., with the area of one FSM being multiplied by the number of threads). Also, to reduce this overhead, some hardware-based thread schedulers 305 are optimized such that their design in hardware is fixed and cannot be changed after fabrication, which may limit flexibility.

Figure 6:
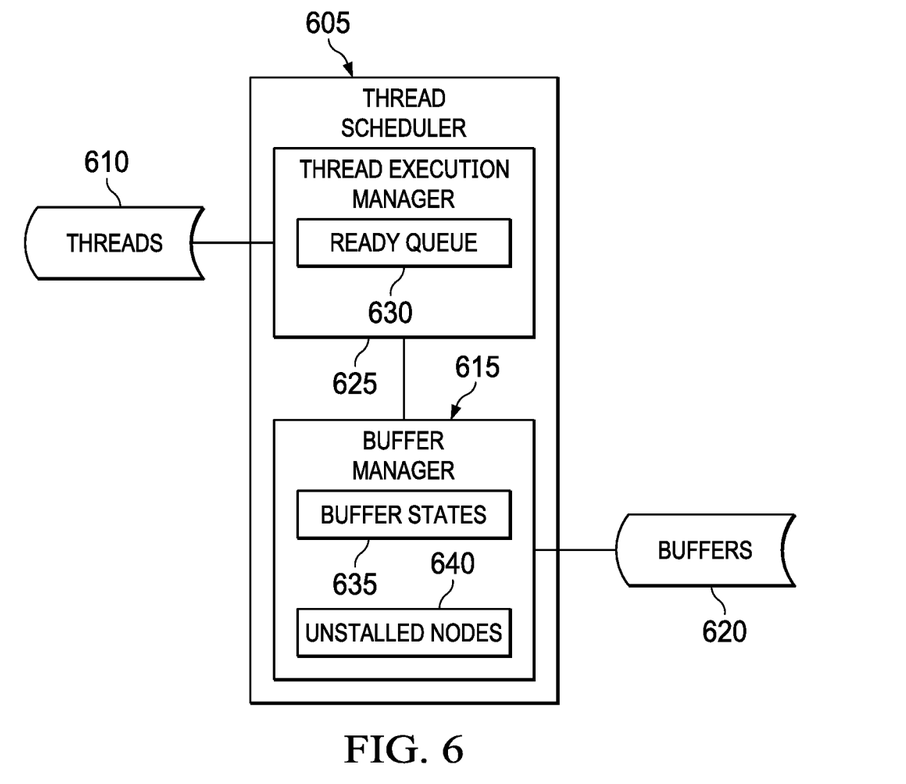
FIG. 6 is a block diagram of an example enhanced thread scheduler implemented in accordance with teachings of this disclosure to perform thread scheduling for multithreaded data processing environments.

With the foregoing limitations/drawbacks of the thread schedulers 205 and 305 in mind, a block diagram of an example enhanced thread scheduler 605 implemented in accordance with teachings of this disclosure is illustrated in FIG. 6. In the illustrated example of FIG. 6, the one example enhanced thread scheduler 605 is able to schedule multiple processing threads 610 implementing respective functional nodes of a data processing flow, such as a video, imaging and/or computer vision processing flow. The example enhanced thread scheduler 605 of FIG. 6 includes an example buffer manager 615 to provide means to determine availability of respective groups of example input and output buffers 620 to be acquired for respective ones of the multiple processing threads of the data processing flow. The example buffer manager 615 also provides means to identify first ones of the processing threads 610 to be stalled due to unavailability of at least one of the buffers in the respective groups of the buffers 620 to be acquired for the first ones of the processing threads 610. The example enhanced thread scheduler 605 of FIG. 6 also includes an example thread execution manager 625 to provide means to initiate execution of second ones of the processing threads that are not identified as stalled (e.g., because the respective groups of the buffers 620 could be acquired for those second ones of the processing threads 610). For example, the thread execution manager 625 of the illustrated example includes an example READY queue 630 that is populated with the thread identifiers for the next functional node(s) that are ready to be executed according to the processing flow. In some examples, the buffer manager 615 and the thread execution manager 625 of the enhanced thread scheduler 605 of FIG. 6 are executed by a processor, such as the example processor 1012, in a single thread, which is different from the plurality of processing threads 610 implementing the respective functional nodes of the data processing flow and being scheduled by the thread scheduler 605.

In the example of FIG. 6, the buffer manager 615 stores respective example states 635 for the input and output buffers 620 in memory (e.g., as an array, list, etc.). For example, a first one of the states 635 for a corresponding first one of the buffers 620 may identify which one or more of the processing threads 610 are stalled due to unavailability of that buffer 620. In at least some examples, the buffer manager 615 updates the first one of the states 635 corresponding to the first one of the buffers 620 to include a respective thread identifier for each one of the processing threads 610 that is stalled due to unavailability of the first one of the buffers 620. In the example of FIG. 6, the buffer manager 615 also updates the states 635 for a corresponding group of buffers 620 acquired by a given thread 610 to indicate that the stalled processing threads associated with those buffers 620 are now unstalled when the given thread 610 releases those buffers 620. In the example of FIG. 6, the buffer manager 615 further maintains an example data structure 640 identifying the stalled processing threads that have become unstalled due to the buffers being released, and the thread execution manager 625 may reattempt to initiate execution of the unstalled processing threads based on the data structure 640. For example, the data structure 640 may be an array, a list, a FIFO memory buffer, a priority-based queue, etc.

Figure 7A:
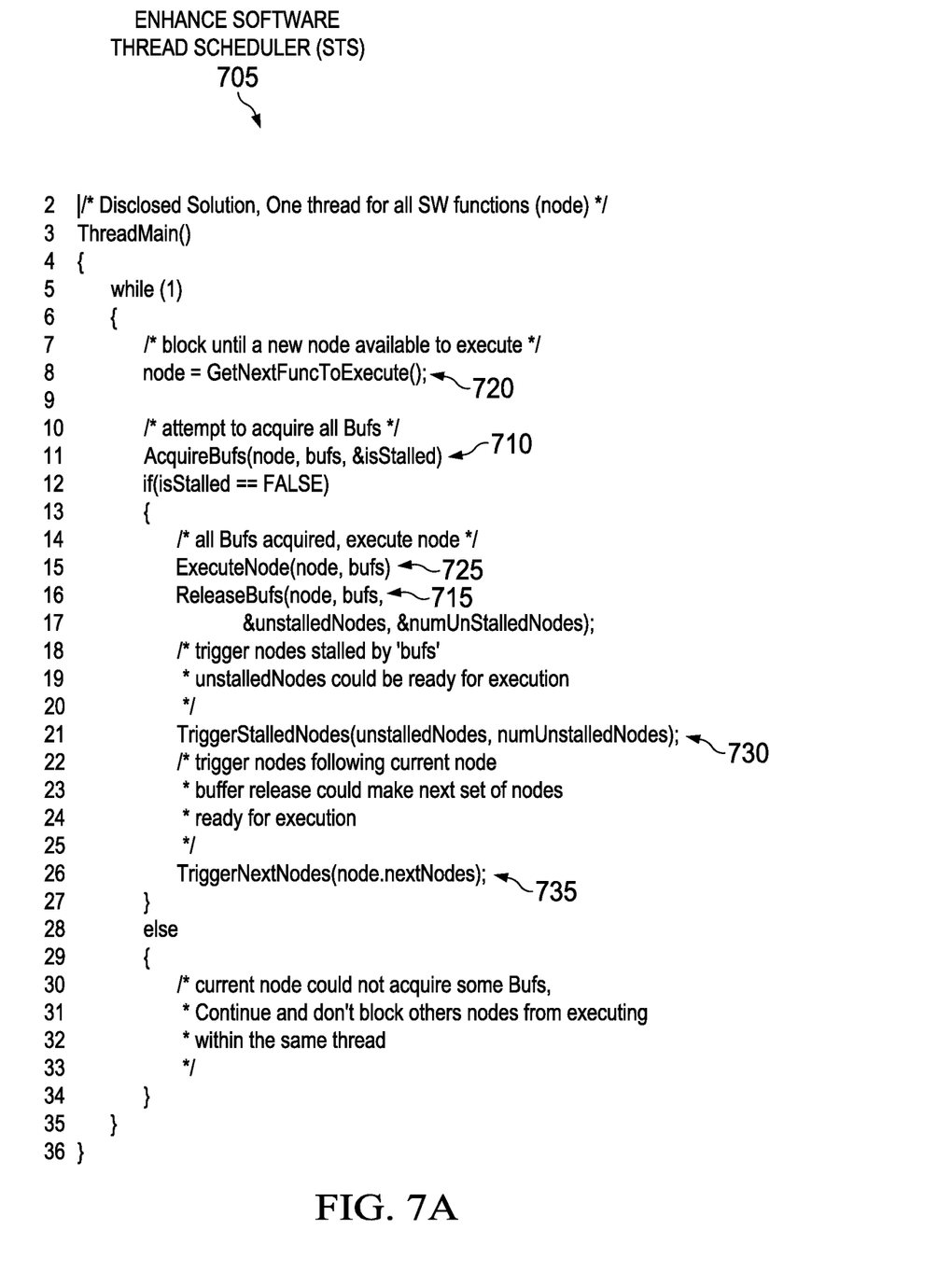
FIGS. 7A-B collectively illustrate an example software-based implementation of the enhanced thread scheduler of FIG. 6.
Figure 7B:
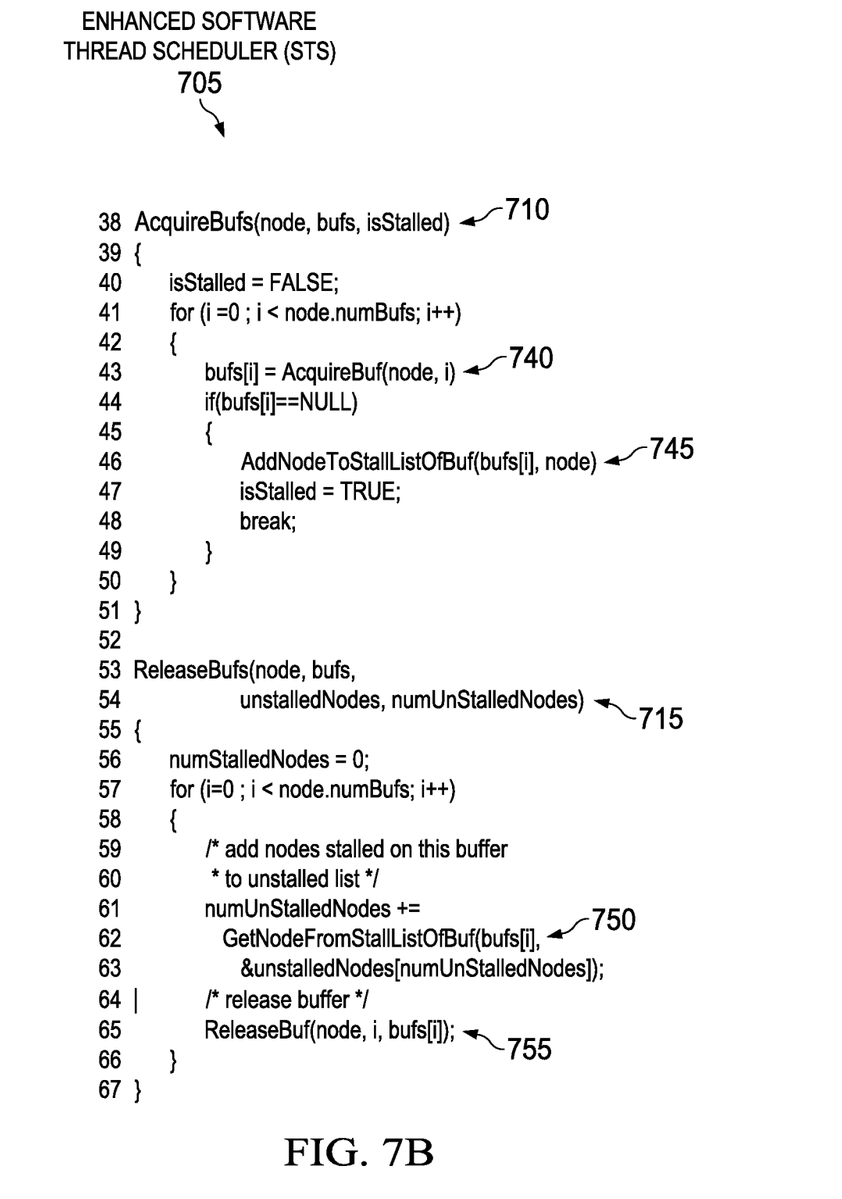

An example software-based implementation 705 of a thread scheduler, such as the enhanced thread scheduler 605 of FIG. 6, is illustrated in FIGS. 7A-B. In the example software-based enhanced thread scheduler 705 of FIGS. 7A-B, example functions AcquireBufs( ) 710 and ReleaseBufs( ) 715 implement the example buffer manager 615 of FIG. 6. In the example software-based enhanced thread scheduler 705 of FIGS. 7A-B, example functions GetNextFuncToExecute( ) 720, ExecuteNode( ) 725, TriggerStalledNodes( ) 730 and TriggerNextNodes( ) implement the example thread execution manager of FIG. 6.

Referring to FIG. 7A, the example software-based enhanced thread scheduler 705 includes an example processing loop beginning at line 5 to schedule execution of multiple threads in a data processing flow, such as a video, imaging and/or computer vision processing flow. The GetNextFuncToExecute( ) function 720 is used to get the next function/node to be executed according to the processing flow. For example, function(s)/node(s) that are ready to be executed according to the processing flow may be added to a READY queue, such as the example READY queue 630 of FIG. 3, which is accessed (e.g., read) by the GetNextFuncToExecute( ) function 720 to get the next function/node to be executed. For example, the GetNextFuncToExecute( ) function 720 may add the thread identifier for the particular thread that is to be executed to implement the next function/node to the READY queue. The AcquireBufs( ) function 710 is used to acquire the group of input and output buffers 620 for the current function/node to be executed. If all of the buffers 620 in the group cannot be acquired (e.g., isStalled equals TRUE), then execution of the thread for the current function/node is stalled, but processing loops back to the GetNextFuncToExecute( ) function 720 to get the next function/node to be executed according to the processing flow. In this way, processing cycles are not wasted while a function/node waits to acquire its buffers.

Referring to FIG. 7B, the AcquireBufs( ) function 710 includes an example AcquireBuf( ) function 740 in combination with digital logic to attempt to acquire all buffers in the group buffers needed by the current function/node to be executed. If a given buffer i is unable to be acquired (bufs[i]==NULL), the AcquireBufs( ) function 710 updates the state (e.g., the corresponding example state 635 of FIG. 6) of that buffer (e.g., as stored in a list) using an example AddNodeToStallListOfBuf( ) function 745 to indicate that the thread for the current function/node to be executed is stalled due to unavailability of that buffer (e.g., by logging the thread identifier (ID) for the current function/node in the buffer's state, as described above).

Returning to FIG. 7A, if all the needed buffers can be acquired for the function/node to be executed (e.g., isStalled equals FALSE), the ExecuteNode( ) function 725 is used to execute the thread for the current function/node. After thread execution completes, the ReleaseBufs( ) function 715 is used to release the buffers that were acquired by the current function/node that was executed. Referring to FIG. 7B, the ReleaseBufs( ) function 715 includes an example GetNodeFromStallListOfBuf( ) function 750 in combination with other digital logic to examine the states of the buffers that were acquired by the current function/node for which execution has completed to identify other functions/nodes whose threads were stalled due to unavailability of these buffers. The GetNodeFromStallListOfBuf( ) function 750 adds these previously stalled functions/nodes to a list or other data structure (e.g., represented by the variable unstalledNodes in FIG. 7B) to indicate that these functions/nodes are now unstalled, and updates the states of the buffers accordingly. For example, the GetNodeFromStallListOfBuf( ) function 750 may add the thread identifiers for the unstalled functions/nodes to the data structure represented by the variable unstalledNodes, where the data structure may correspond to the example data structure 640 of FIG. 6. The ReleaseBufs( ) function 715 further includes an example ReleaseBuf( ) function 755 to release each of the buffers that were acquired by the current function/node that was executed, thereby making these buffers available for a next function/node to be executed.

Returning to FIG. 7A, the TriggerStalledNodes( ) function 730 is used to reattempt to initiate execution of the previously stalled function(s)/node(s) that are now unstalled due to buffers being released. For example, the TriggerStalledNodes( ) function 730 can add the previously stalled function(s)/node(s), which are now unstalled due to buffers being released, to the READY queue. The TriggerNextNodes( ) function 735 is used to execute the next function(s)/node(s) following in the data processing flow from the current function/node that was executed. For example, the TriggerNextNodes( ) function 735 can add the next function(s)/node(s) following in the processing flow to the READY queue.

Figure 8:
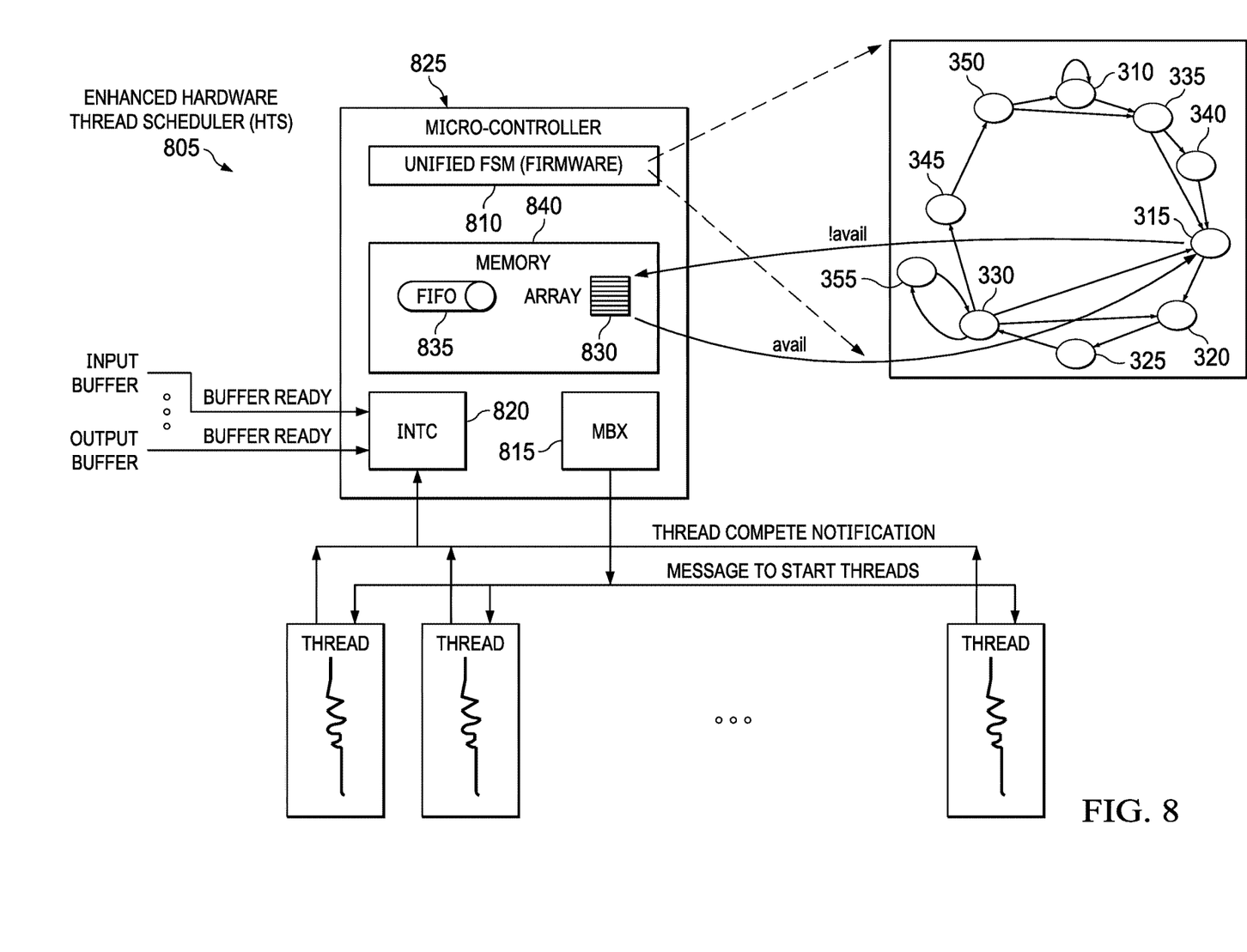
FIG. 8 illustrates an example hardware-based implementation of the enhanced thread scheduler of FIG. 6.

An example hardware-based implementation 805 of a thread scheduler, such as the enhanced thread scheduler 605 of FIG. 6, is illustrated in FIG. 8. The example hardware-based enhanced thread scheduler 805 of FIG. 8 includes an example FSM 810 and associated digital logic to implement the example thread execution manager 625 of FIG. 6. For example, the example hardware-based enhanced thread scheduler 805 of FIG. 8 includes digital logic implementing an example mailbox (MBX) 815 to send messages/signals to start execution of processing threads, and digital logic implementing an example interrupt controller (INTC) 820 to receive execution complete notifications from processing threads. In the illustrated example of FIG. 8, the FSM 810 is implemented by firmware executed by an example microcontroller 825, which enables the FSM 810 to be updated over time.

The example hardware-based enhanced thread scheduler 805 of FIG. 8 also includes an example array 830, an example FIFO 835 and associated example digital logic, such as the INTC 820, to implement the example buffer manager 615 of FIG. 6. For example, the INTC 820 is used to receive notifications concerning buffer availability from the input and output buffers of the processing environments. For example, the buffers may set respective bits in memory, in one or more registers, etc., to indicate their availability. In the illustrated example of FIG. 8, the array 830 stores the respective states of the input and output buffers, which includes a listing of function/nodes (e.g., thread IDs), if any, that are stalled waiting for the respective buffers to become available, as described above. In the illustrated example of FIG. 8, the FIFO 835 provides a data structure to indicate which previously stalled functions/nodes have become unstalled due to buffers being released and, thus, can be executed. The FIFO 835 may also list other function/nodes in the processing flow that are not stalled and, thus, can be executed. In the illustrated example of FIG. 8, the array 830 and the FIFO 835 are implemented by example memory 840 of the example micro-controller 825.

In the example hardware-based enhanced thread scheduler 805 of FIG. 8, the FSM 810 is also involved in implementing the buffer manager 615. For example, the FSM 810 checks the array 830 for the states of the buffers to be acquired by a current function/node to be executed. If a buffer is not available, the FSM 810 logs the thread ID for the current function/node in the state maintained in the array 830 for that buffer. Later, when an available signal is received from that buffer, the FSM 810 can examine the state of that buffer in the array 830, retrieve the thread ID(s) for any stalled functions/nodes associated with that buffer, and reschedule the thread ID(s) for execution by writing the thread ID(s) to the FIFO 835. Notably, because just one FSM 810 is used to implement the example hardware-based enhanced thread scheduler 805 of FIG. 8, the FSM can be implemented in firmware rather than requiring hardware to meet space requirements.

The example enhanced thread scheduler 605 illustrated in FIGS. 6-8 has been described herein in the context of being used to perform thread scheduling for multithreaded image data processing environments. Such multithreaded image data processing environments can include any type of computer processing system, such as a computer vision system, a computer imaging system, a computer video processing system, etc. However, the example enhanced thread scheduler 605 is not limited to being used in such multithreaded data processing environments. Rather, the example enhanced thread scheduler 605 can be adapted for use in any computer processing environment, including any multithreaded computer processing environment, structured to employ respective threads to implement respective functional nodes of a processing flow, such as, but not limited to, the data processing flows described above. Furthermore, although the above examples utilize one example enhanced thread scheduler 605 to schedule threads for a multithreaded processing environment, in other examples, more than one such example enhanced thread scheduler 605 can be used to schedule threads for the multithreaded processing environment. For example, the possible threads to be scheduled in the multithreaded processing environment can be grouped in any manner or according to any criteria, and different enhanced thread schedulers 605 with respective groups of the threads. In such examples, the enhanced thread schedulers 605 can be structured to schedule only those threads in the respective groups of threads with which the respective enhanced thread schedulers 605 are associated.

While example manners of implementing the enhanced thread scheduler 605 are illustrated in FIGS. 6-8, one or more of the elements, processes and/or devices illustrated in FIGS. 6-8 may be combined, divided, re-arranged, omitted, eliminated and/or implemented in any other way. Further, the example buffer manager 615, the example thread execution manager 625 and, more generally, the example enhanced thread scheduler 605 of FIGS. 6-8 may be implemented by hardware, software, firmware and/or any combination of hardware, software and/or firmware. Thus, for example, any of the example buffer manager 615, the example thread execution manager 625 and, more generally, the example enhanced thread scheduler 605 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example enhanced thread scheduler 605, the example buffer manager 615 and/or the example thread execution manager 625 is/are hereby expressly defined to include a non-transitory computer readable storage device or storage disk such as a memory, a digital versatile disk (DVD), a compact disk (CD), a Blu-ray disk, etc. including the software and/or firmware. Further still, the example enhanced thread scheduler 605 may include one or more elements, processes and/or devices in addition to, or instead of, those illustrated in FIGS. 6-8, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
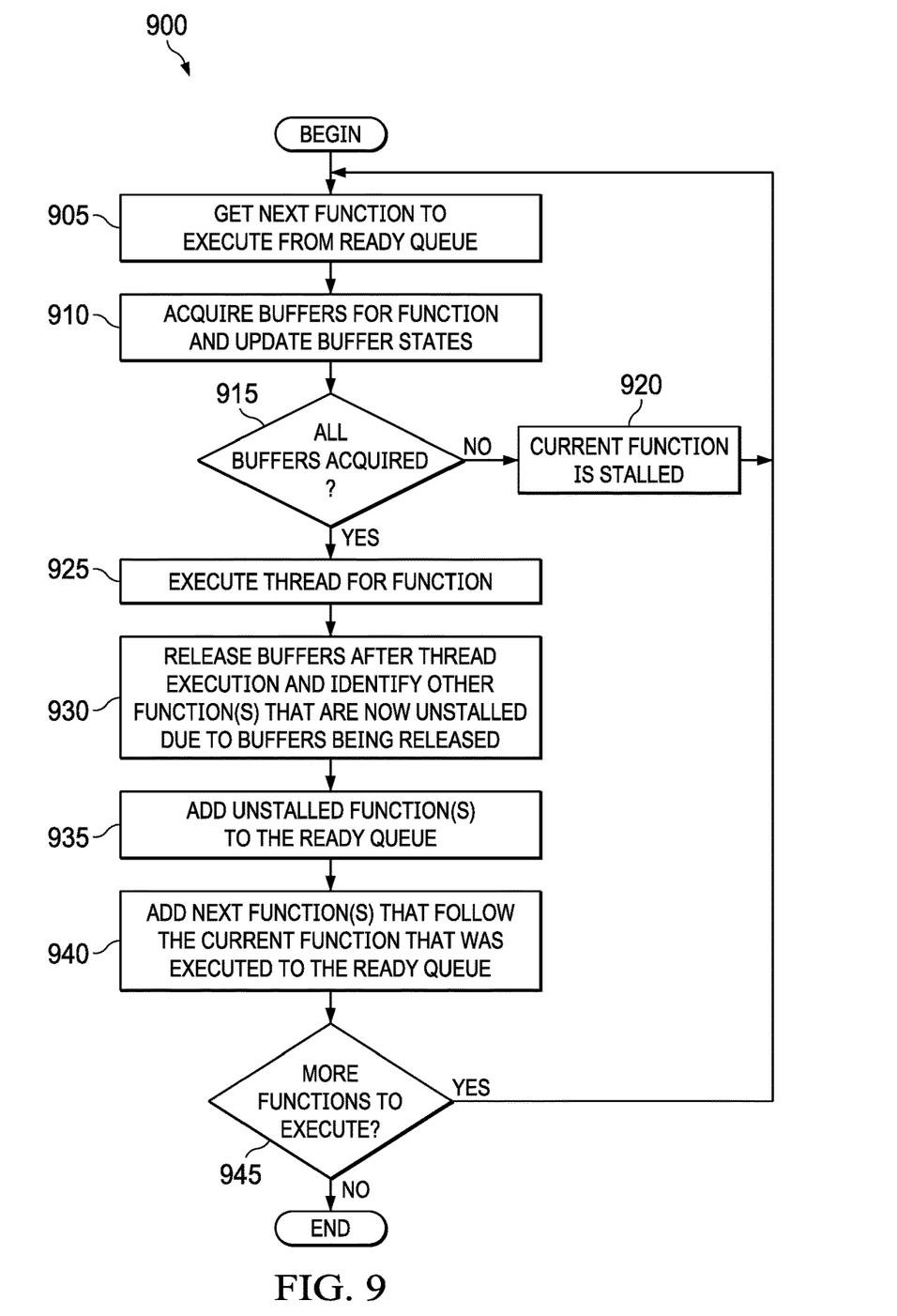
FIG. 9 is a flowchart representative of example machine readable instructions that may be executed to implement the example enhanced thread scheduler of FIG. 6.

A flowchart representative of example hardware logic, machine readable instructions, hardware implemented state machines, and/or any combination thereof for implementing a thread scheduler, such as the example enhanced thread scheduler 605, is shown in FIG. 9. In this example, the machine readable instructions may be an executable program or portion of an executable program for execution by a computer processor, such as the processor 1012 shown in the example processor platform 1000 discussed below in connection with FIG. 10. The program, or portion(s) thereof, may be embodied in software stored on a non-transitory computer readable storage medium such as a CD-ROM, a floppy disk, a hard drive, a digital versatile disk (DVD), a Blu-Ray Disk™, or a memory associated with the processor 1012, but the entire program or programs and/or parts thereof could alternatively be executed by a device other than the processor 1012 and/or embodied in firmware or dedicated hardware (e.g., implemented by an ASIC, a PLD, an FPLD, discrete logic, etc.). Further, although the example program is described with reference to the flowchart illustrated in FIG. 9, many other methods of implementing a thread scheduler may alternatively be used. For example, with reference to the flowchart illustrated in FIG. 9, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

An example program 900 that may be executed to implement the thread scheduler (e.g., thread scheduler 605 of FIG. 6) is represented by the flowchart shown in FIG. 9. With reference to the preceding figures and associated written descriptions, the example program 900 of FIG. 9 begins execution at block 905 at which a thread execution manager 625 of a thread scheduler gets the next function to be executed in a data processing flow from the READY queue 630. For example, the data processing flow may be a video, imaging and/or computer vision processing flow. At block 910, the buffer manager 615 of the thread scheduler attempts to acquire the respective group of input and output buffers 620 for the current function to be executed, and updates the state(s) 635 of the buffer(s) that could not be acquired to identify the current function as stalled due to lack of availability of those buffer(s), as described above. If any of the input and output buffers 620 for the current function could not be acquired (block 915), the thread execution manager 625 of the thread scheduler stalls execution of particular thread that is to implement the current function (block 920) and processing returns to block 905 to allow the thread execution manager 625 of the thread scheduler to get the next function to be executed (e.g., from the READY queue 630).

However, if all the input and output buffers 620 for the current function were acquired (block 915), then at block 925 the thread execution manager 625 of the thread scheduler executes the processing thread for the current function. At block 930, the buffer manager 615 of the thread scheduler releases the buffers for the current function after the thread for the current function completes execution. Also, at block 930, the buffer manager 615 of the thread scheduler examines the states 635 of the released buffers to identify, as described above, any previously stalled function(s) that can be unstalled. For example, the buffer manager 615 identifies the unstalled function(s) by adding the thread identifier(s) for the thread(s) corresponding to the unstalled function(s) (or, in other words, the unstalled thread(s)) to the data structure 640. At block 935, the thread execution manager 625 of the thread scheduler reattempts to initiate execution of the thread(s) for the function(s) that were unstalled at block 930 by, for example, adding the unstalled function(s) to the READY queue 630. At block 940, the thread execution manager 625 of the thread scheduler attempts the execute the thread(s) for the next function(s) that follow the current function in the processing flow by, for example, adding the next function(s) to the READY queue 630. Then, if function execution is to continue (block 945), processing loops back to block 905 at which the thread execution manager 625 of the thread scheduler gets the next function for execution according to the processing flow. Otherwise, execution of the example program 900 ends.

Figure 10:
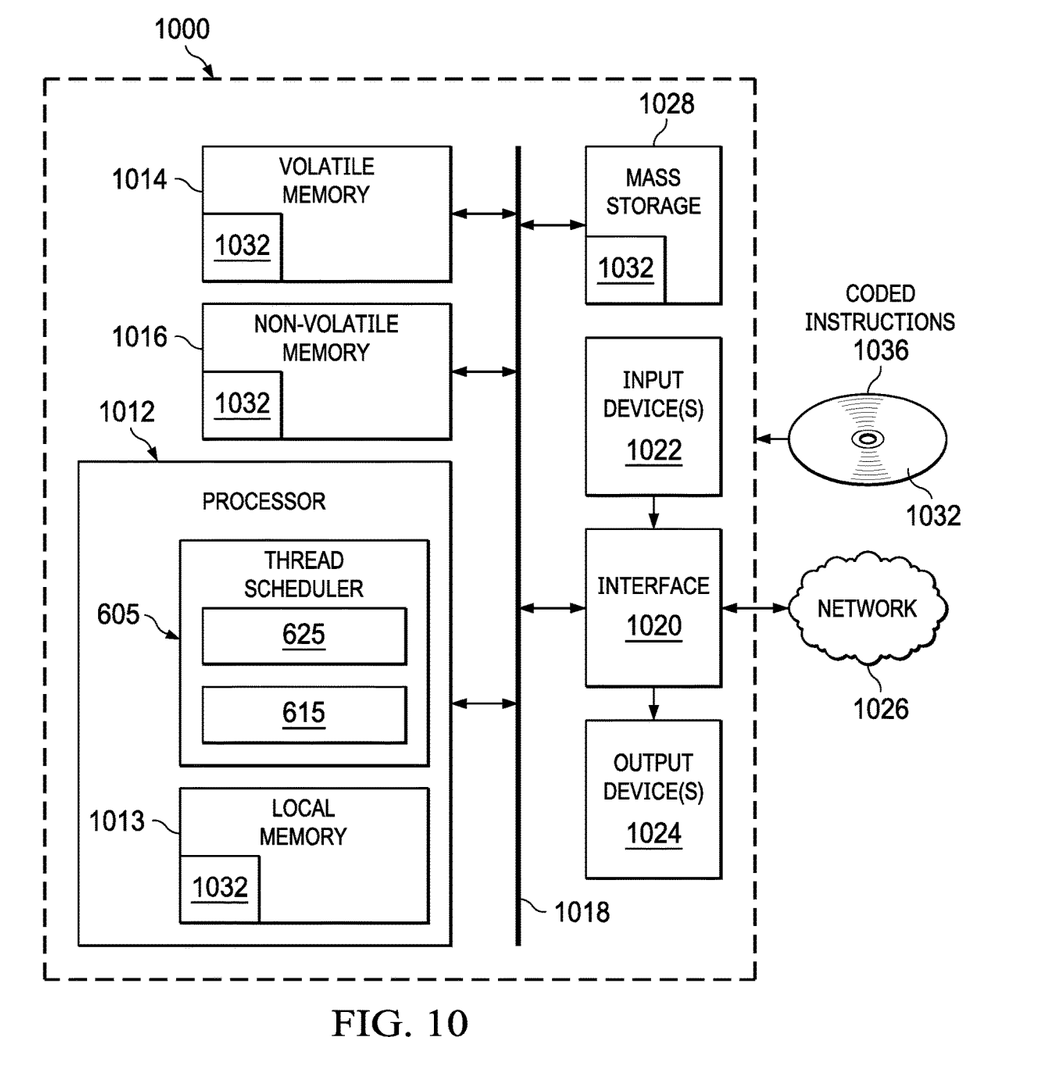
FIG. 10 is a block diagram of an example processor platform structured to execute the example machine readable instructions of FIGS. 7A-B and/or 9 to implement the example enhanced thread scheduler of FIG. 6.

FIG. 10 is a block diagram of an example processor platform 1000 structured to execute the instructions of FIGS. 7A-B and/or 9 to implement a thread scheduler such as the example enhanced thread scheduler 605 of FIG. 6. The processor platform 1000 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box a digital camera, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer. The hardware processor 1012 may be a semiconductor based (e.g., silicon based) device. In this example, the processor 1012 implements the example buffer manager 615 and/or the example thread execution manager 625 of the example enhanced thread scheduler 605.

The processor 1012 of the illustrated example includes a local memory 1013 (e.g., a cache). The processor 1012 of the illustrated example is in communication with a main memory including a volatile memory 1014 and a non-volatile memory 1016 via a link 1018. The link 1018 may be implemented by a bus, one or more point-to-point connections, etc., or a combination thereof. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit(s) a user to enter data and commands into the processor 1012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1000, can allow the user to control the computer system and provide data to the computer using physical gestures, such as, but not limited to, hand or body movements, facial expressions, and face recognition.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1020 of the illustrated example, thus, typically includes a graphics driver card, a graphics driver chip or a graphics driver processor.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID (redundant array of independent disks) systems, and digital versatile disk (DVD) drives.

Coded instructions 1032 corresponding to the instructions of FIGS. 7A-B and/or 9 may be stored in the mass storage device 1028, in the volatile memory 1014, in the non-volatile memory 1016, in the local memory 1013 and/or on a removable tangible computer readable storage medium, such as a CD or DVD 1036.

From the foregoing, it will be appreciated that example methods, apparatus and articles of manufacture (e.g., physical storage media) to implement thread scheduling for multithreaded data processing environments have been disclosed. Such enhanced thread scheduling, as disclosed herein, provides technical solutions that overcome the technical problems/drawbacks associated with other thread schedulers. For example, enhanced thread scheduling as disclosed herein is able to utilize a single, enhanced thread scheduler (e.g., executing in its own processing thread) to schedule multiple other processing threads implementing respective functional nodes included in a data processing flow, such as a video, imaging and/or computer vision processing flow. Accordingly, such enhanced thread scheduling disclosed herein avoids the need for thread scheduler replication across each processing thread and, thus, achieves memory/resource overhead reduction relative to other thread scheduler implementations. Furthermore, because a single, enhanced thread scheduler can schedule multiple processing threads, hardware versions of the enhanced thread scheduler can be implemented with firmware, thereby supporting scalability and improvements after being implemented in silicon.

As disclosed above, some example enhanced thread schedulers implemented in accordance with teachings of this disclosure employ an enhanced buffer definition which contains an additional state attribute. In some such examples, the buffer descriptor stored in memory for each buffer, which may define the message size, address, format etc., for the given buffer, is modified to include an associated state attribute, or state, which is updated by the enhanced thread scheduler to contain a list of the stalled threads (e.g., listed by thread identifier) that are blocked waiting for that particular buffer to become available. Some example enhanced thread schedulers implemented in accordance with teachings of this disclosure additionally or alternatively employ a common FSM to perform scheduling of the different possible processing threads for execution. Such an example enhanced thread scheduler can utilize the common FSM to store the thread identifiers for threads that are stalled waiting for given ones of the buffers to become available in the respective states for the buffers that are unavailable. The FSM of the enhanced thread scheduler in such an example can also utilize a single, non-blocking FIFO to store the thread identifiers of previously stalled threads that have become unstalled when the buffers they are waiting on become available, and can update the states of those buffers to remove the thread identifiers of the unstalled threads, to thereby restore the previously stalled threads when their respective buffers become available.

"Including" and "comprising" (and all forms and tenses thereof) are used herein to be open ended terms. Thus, whenever a claim lists anything following any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. Also, as used herein, the terms "computer readable" and "machine readable" are considered equivalent unless indicated otherwise.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   a buffer manager circuit configured to:
      determine availability of buffers to be acquired for respective processing threads; and
      identify a first one and a second one of the respective processing threads as stalled due to unavailability of a first buffer in the buffers to be acquired for the first one and the second one of the processing threads; and
      store respective states for each of the buffers in memory, a first one of the respective states corresponding to the first buffer, the first one of the states identifies the first one and the second one of the processing threads that are stalled due to unavailability of the first one of the buffers; and
   a thread execution manager circuit configured to initiate execution of a third one of the processing threads that is not identified as stalled.

2. The system of claim 1, wherein the buffer manager circuit and the thread execution manager circuit are implemented by a processor in a processing thread that is different from the processing threads implementing the respective functional nodes of an image processing flow.

3. The system of claim 1, wherein the buffer manager circuit is to update the first one of the states corresponding to the first buffer to include a respective thread identifier for each one of the first ones of the processing threads that is stalled due to unavailability of the first one of the buffers.

4. The system of claim 3, wherein the buffer manager circuit is configured to remove thread identifiers for unstalled threads from the respective states.

5. The system of claim 1, wherein the buffer manager circuit is configured to update the first one of the states corresponding to the first buffer to indicate that the first one and the second one of the processing threads that were stalled due to unavailability of the first buffer have become unstalled threads when a third one of the processing threads that had acquired the first buffer prior to execution has released the first buffer.

6. The system of claim 5, wherein the buffer manager circuit is configured to maintain a data structure in memory identifying the unstalled threads, and the thread execution manager circuit is configured to reattempt to initiate execution of the unstalled threads based on the data structure.

7. The system of claim 6, wherein the data structure includes at least one of a first input first output (FIFO) memory buffer or a priority-based queue.

8. A non-transitory computer readable medium comprising computer readable instructions that, when executed by a processor, cause the processor to at least:
determine availability of buffers to be acquired for processing threads;
identify a first and a second thread of the processing threads as stalled due to unavailability of a first buffer to be acquired for the first and the second threads;
store states for each of the buffers in memory, a first state of the states corresponding to the first buffer of the buffers, the first state to identify the first and the second thread of the processing threads that are stalled due to unavailability of the first buffer; and
initiate execution of a third thread of the processing threads that is not identified as to be stalled.

9. The non-transitory computer readable medium of claim 8, wherein the instructions are to be executed by the processor in a processing thread that is different from the processing threads implementing functional nodes of a processing flow.

10. The non-transitory computer readable medium of claim 8, wherein the instructions cause the processor to update the first state corresponding to the first buffer to include a thread identifier for each thread that is stalled due to unavailability of the first buffer.

11. The non-transitory computer readable medium of claim 8, wherein the first buffer was acquired by a fourth thread of the processing threads, and the instructions cause the processor to update the first state to indicate that the first and second processing threads have become unstalled threads when the fourth thread has released the first buffer.

12. The non-transitory computer readable medium of claim 11, wherein the instructions cause the processor to remove thread identifiers for unstalled threads from the first state to update the first state to indicate that the first and second threads that were stalled due to unavailability of the first buffer have become unstalled.

13. The non-transitory computer readable medium of claim 11, wherein the instructions cause the processor to:
maintain a data structure identifying unstalled processing threads; and
reattempt to initiate execution of the unstalled processing threads based on the data structure.

14. A method comprising:
determining, by a processor, availability of buffers to be acquired for respective processing threads implementing respective functional nodes of a processing flow;
identifying, by the processor, a first one and a second one of the respective processing threads as stalled due to unavailability of a first buffer to be acquired for the first one and the second one of the processing threads;
storing, by the processor, respective states for each of the buffers in memory, a first one of the respective states corresponding to the first buffer, the first one of the states identifies the first one and the second one of the processing threads that are stalled due to unavailability of the first one of the buffers; and
initiating, with the processor, execution of a third one of the processing threads that is not identified as stalled.

15. The method of claim 14, further including updating the first one of the states corresponding to the first buffer to include a respective thread identifier for each one of the processing threads that is stalled due to unavailability of the first one of the buffers.

16. The method of claim 15, wherein the first one of the buffers was acquired by a fourth one of the processing threads, and further including updating the first one of the states to indicate that the first one and the second one of the processing threads that were stalled due to unavailability of the first one of the buffers have become unstalled threads when the fourth one of the processing threads has released the first one of the buffers.

17. The method of claim 16, further including:
maintaining a data structure identifying the unstalled threads; and
reattempting to initiate execution of the unstalled threads based on the data structure.

* * * * *